Patented July 12, 1938

2,123,863

UNITED STATES PATENT OFFICE 2,123,863

FOOD COMPOSITION AND PROCESS OF INHIBITING OXYGENATION THEREOF

Harvey D. Royce, Savannah, Ga., assignor to The Southern Cotton Oil Company, New Orleans, La., a corporation of New Jersey No Drawing. Application July 30, 1936,
Serial No. 93,525

4 Claims. (Cl. 99—163)

My invention relates to food composition and process of inhibiting oxygenation thereof and has to do, more particularly, with the use of a novel synthetic compound as an antioxidant, that is, an inhibitor of oxygenation, in retarding the development of rancidity or oxidation in fats, oils, fatty compositions, and unsaturated organic compounds.

It has been the practice, for many years, to add various antioxidant compounds to fats, oils and unsaturated organic compounds, to retard the development of rancidity and oxidation, but the most effective antioxidants or inhibitors of rancidity, such as the quinones, polyphenols, naphthols, aromatic amino derivatives, and unsaturated polybasic aliphatic acids, are toxic and undesirable for use in the edible fatty compositions. There is, therefore, a distinct need for non-toxic and neutral flavored antioxidants, which will enhance the keeping quality of edible fats and fatty foods, without detracting from their palatability and digestibility, and the principal object of my invention is to provide a fatty food composition including an oxygenation inhibitor or antioxidant of that character.

A further object of my invention is to provide a process for inhibiting oxygenation in food compositions by incorporating therein a synthetic compound derived from incompletely esterified fatty acid esters of polyhydric alcohols, which may be added to edible fats, oils or fatty compositions without impairing their edibility, palatability or digestibility, and which retards in a marked degree the development of rancidity therein.

Further objects, and objects relating to details and economies of operation, will definitely appear from the detailed description to follow. In various instances, I have accomplished the objects of my invention by the means described in the following specification, and the invention is clearly defined and pointed out in the appended claims.

This application is a continuation in part of my application filed August 4, 1934, Serial No. 738,543, for Stabilized food composition and process of stabilizing the same.

In general, my invention consists in the inhibiting of oxygenation of food compositions by the incorporation therein of new, synthetic, phosphatic, fat-soluble products resulting from the treatment of incompletely esterified fatty acid esters of polyhydric alcohols, in successive steps, with phosphoric anhydride and primary aliphatic amino alcohols, which products constitute a class of inhibitors or antioxidants eminently suited for the preservation of edible fats, oils, fatty compositions, and unsaturated organic compounds. Owing to the complexity of the chemical reactions involved, it has not been possible to identify all of the phosphatic compounds included in this classification. In general, however, the new antioxidants used in my present invention may be represented by the formula:

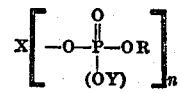

in which P is phosphorus, O is oxygen, R is hydrogen or an alkyl group, OY is an aliphatic primary beta amino alkoxy radical linked to P through its oxygen, X is a polyhydric alcohol group with at least one of the (OH) groups esterified with a fatty acid, and $n$ is a small whole number.

(1) The following is a specific example of the procedure which I have followed in preparing an inhibitor of oxygenation for use in my invention. A substance consisting of a mixture of mono- and di-glycerides of the cottonseed fatty acids, having an acetyl number of about 170, is prepared by re-esterifying cottonseed oil with one-fourth its weight of glycerol. This mixture, which I call mono-glyceride concentrate, is mixed with one-fifth its weight of phosphoric acid anhydride at 60° C., in a dry atmosphere, and the temperature is allowed to rise to 115° C. The product of this reaction is essentially a mixed phosphoric acid-fatty acid ester of glycerol. This mixed ester is then cooled to 70° C., and one-sixth its weight of beta amino ethanol is added slowly, with stirring, keeping the temperature below 100° C. That fraction of the product of this reaction which is fat-soluble, comprises the antioxidant of my invention, and may be separated from the fat-insoluble residue by benzol extraction and then freed from the solvent by vacuum steam distillation.

The structure of such an inhibitor or antioxidant prepared from mono-glyceride of cottonseed fatty acids, phosphoric anhydride, and beta amino ethanol would be represented as follows:

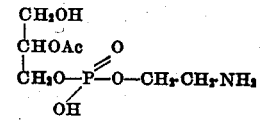

in which Ac is an acyl group derived from the mixed fatty acids of cottonseed, and the remaining terms have their customary chemical significance.

The antioxidant thus produced is of amorphous, sticky consistency, resembling lanolin in that respect, and of a light yellow to brown color. Its melting point is indefinite and, on heating, it changes gradually from a salve-like consistency to an oily fluid. It is completely soluble in warm water, giving a milky emulsion. It is partially soluble in alcohol. It is wholly soluble in ether, chloroform and fixed oils.

I have found that the inhibitor or antioxidant so prepared may be used effectively in inhibiting rancidity of edible fats, and oils and unsaturated organic compounds. For instance, in the preservation of vegetable shortening compound, I dissolved one part of the phosphatic antioxidant, prepared as heretofore described, in 5000 parts of the shortening. The comparative keeping qualities of the treated and untreated shortening were measured by following the increase in peroxide values under accelerated aging conditions. After seven hours aging at 100° C. the respective peroxide values for the control and the treated shortening were 112 and 34. Moreover, at the end of this test the odor of the control was strongly rancid, whereas the treated sample was sweet and unchanged in odor. In general, I have found that the "shelf life" of commercial edible fats, oils and fatty foods will be increased from 50 to 200 per cent by incorporating therewith from 0.01 to 0.05 per cent of the phosphatic antioxidants in accordance with my present invention.

(2) As a second example of procedure which I have followed in preparing an inhibitor for use in practicing my invention, diglycol stearate was mixed with one fifth of its weight of phosphoric acid anhydride at 80° C., in a dry atmosphere, and the temperature rose to 95° C. during the reaction. The mixture was then cooled to 60° C. and neutralized with monoethanolamine. To the resulting product there was added one half its weight of ethyl alcohol, whereupon a separation occurred, the antioxidant remaining in solution, and a considerable quantity of unidentified fat-insoluble material separated out. The alcohol was distilled from the antioxidant in a current of steam at reduced pressure, and the antioxidant product was tested for oxygenation-inhibiting strength by adding 0.02 per cent (one part to 5000) to salad oil, and the induction period of oxidation of the oil was found to be 6 days aging at 63° C. for the treated sample, as compared with 2 days for the untreated control sample.

(3) As a third example of procedure followed in preparing such an inhibitor or antioxidant, eighty (80) grams of butyric acid was heated with thirty (30) grams of glycol in the presence of 0.05% sodium carbonate for two hours in a current of carbon monoxide. To the resulting glycol butyrate ester there was added thirty (30) grams of phosphoric acid anhydride, after which the mixture was neutralized with monoethanolamine, and treated with ethyl alcohol and the antioxidant product recovered, as described above as to Example 2. The antioxidant thus obtained was tested as to its strength in inhibiting induction of oxygenation and rancidity by adding 0.02 per cent by weight to salad oil, and the induction period of oxygenation was found to be 5 days for the treated sample, as compared with 2 days for the untreated control sample.

It will thus be seen that the antioxidant can be prepared from fatty acids having four or more carbon atoms, and that I have found that glycol, diglycol or glycerol may be used, so long as at least one hydroxyl group is esterified with the fatty acid.

One of the chief advantages of the antioxidants of my present invention over other antioxidants arises from their fat-like character. Since they are apparently essentially phosphatic derivatives of fatty glycerides, and closely related to the natural phospholipids in structure and physiological action, their presence in edible fats and foods is not harmful or objectionable.

Whenever, in this specification, I refer to "incompletely esterified fatty acid esters of polyhydric alcohols", I mean all fatty acid esters of polyhydric alcohols having one or more free unesterified alcoholic hydroxyl groups in the molecule. In other words, it is essential to have at least one free hydroxyl group in the fatty ester which is to be treated with phosphoric acid anhydride, but it is allowable to have more than one free hydroxyl group. Likewise, it is essential to have at least one of the alcoholic hydroxyl groups of the polyhydric alcohol portion of the molecule esterified with a fatty acid, but it is also allowable to have more than one hydroxyl group esterified with a fatty acid.

While, in the foregoing paragraphs, I have mentioned specifically certain phosphatic, fat-soluble antioxidants, it should be understood that my invention is not limited to the use of pure substances, or compositions containing these particular substances, but includes compositions containing as fat antioxidants various other substances falling within the broad scope of my invention. However, I do not intend to include as within my invention the use of natural phospholipids. While the structures of certain of the synthetic antioxidants prepared in accordance with my invention are much like those of the naturally occurring phospholipids, these synthetic antioxidants are distinguished from the natural phospholipids by the following properties:

(a) Greater solubility in water. The natural phospholipids swell in the presence of water, but do not form a true solution, whereas the synthetic antioxidants of my invention dissolve readily in water and form a true solution.

(b) Absence of optical activity. The synthetic inhibitors have no optical activity, that is, do not rotate the plane of polarized light, whereas natural phospholipids rotate the plane of polarized light.

(c) Higher antioxidant index. For the purposes of this specification, I will define the antioxidant index as the degree of protection against rancidity conferred upon cottonseed oil by the incorporation of a small amount of the antioxidant. In specific terms, the numerical value of an antioxidant index is determined by the ratio of the increase in peroxide value of oil or fat samples aged at 100° C., with and without the inhibitor or antioxidant added. This is to say, by the following formula:

$$\frac{\text{Peroxide value of untreated oil}}{\text{Peroxide value of treated oil}} = \text{antioxidant index.}$$

For instance, referring to the preceding paragraph (Example 1), in which I described the results attained by mixing a small percentage of antioxidant with shortening, the specific antioxidant index, using the figures there given, would be $$\frac{112}{34} = 3.3$$

(d) Higher phosphorus content. The phosphorus content of the synthetic antioxidant prepared according to the specific example given above will be approximately 4%, which is considerably higher than in natural phospholipids.

I am aware that my invention is susceptible of considerable variation without departing from the spirit thereof and, therefore, I claim it broadly, as indicated by the appended claims.

What I claim is:

1. A food composition having improved keeping qualities comprising an edible fat having incorporated therein a small amount of a synthetic, fat-soluble antioxidant represented by the general formula:

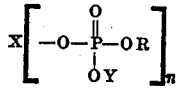

in which P is phosphorus, O is oxygen, R is hydrogen or an alkyl group, OY is a beta amino ethanol radical linked to P through its oxygen, X is a radical of a polyhydric alcohol selected from the group consisting of glycerol and diglycol in which at least one OH group is esterified with a fatty acid having at least four carbon atoms and at least one OH group is not esterified, and $n$ is a small whole number.

2. A food composition having improved keeping qualities comprising an edible fat having incorporated therein a small amount of a synthetic, fat-soluble antioxidant represented by the formula:

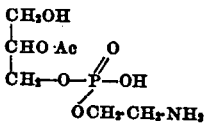

in which Ac is an acyl group derived from a fatty acid having at least four carbon atoms, and the remaining terms have their customary chemical significance.

3. The process of inhibiting the inception of oxygenation of fatty food compositions, which comprises mixing therewith a small amount of an incompletely esterified, fat-soluble mixed phosphoric acid fatty acid ester of a polyhydric alcohol, represented by the formula:

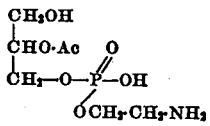

in which Ac is an acyl group derived from a fatty acid having at least four carbon atoms, and the remaining terms have their customary chemical significance.

4. The process of inhibiting the inception of oxygenation of fatty food compositions which comprises admixture therewith of a small amount of an incompletely esterified fat-soluble mixed phosphoric acid-fatty acid ester represented by the general formula:

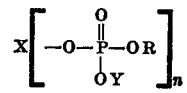

in which P is phosphorus, O is oxygen, R is a meta amino ethanol radical linked to P through its oxygen, X is a radical of a polyhydric alcohol selected from the group consisting of glycerol and diglycol in which at least one OH group is esterified with a fatty acid having at least four carbon atoms and at least one OH group is not esterified, and $n$ is a small whole number.

HARVEY D. ROYCE.

CERTIFICATE OF CORRECTION.

Patent No. 2,123,863.   July 12, 1938.

HARVEY D. ROYCE.

It is hereby certified that error appears in the printed specification of the above numbered patent requiring correction as follows: Page 3, second column, line 31, claim 4, for "meta" read beta; and that the said Letters Patent should be read with this correction therein that the same may conform to the record of the case in the Patent Office.

Signed and sealed this 30th day of August, A. D. 1938.

Henry Van Arsdale (Seal)

Acting Commissioner of Patents.